US005661643A

United States Patent [19]
Blakely et al.

[11] Patent Number: 5,661,643
[45] Date of Patent: Aug. 26, 1997

[54] UNIVERSAL POWER MODULE

[75] Inventors: John H. Blakely, Asheville, N.C.; Robert T. Elms, Monroeville, Pa.

[73] Assignee: Eaton Corporation, Cleveland, Ohio

[21] Appl. No.: 603,826

[22] Filed: Feb. 20, 1996

[51] Int. Cl.$^6$ .................................................. G05F 1/577
[52] U.S. Cl. .................................................. 363/21
[58] Field of Search ......................... 363/20.21, 130–131, 363/22–25; 323/266, 282, 284, 407

[56] References Cited

PUBLICATIONS

Model No. 587 Voltage and Current Surge Generator, p. 7, Velonex, 1988.
M. Brown, 1200V MOSFET Allows Switching Power Supply to Operate Over 90 to 600V Input Range with No Jumpers, pp. 1–4 Fall 1994, *Power Science*, vol. 1, No. 2.
Motorola, Inc., Figure 29–27 Watt Off–Line Flyback Regulator, p. 612, 1989, Linear/Switchmode Voltage Regulator Handbook, 4th Edition.

*Primary Examiner*—Aditya Krishnan
*Attorney, Agent, or Firm*—Martin J. Moran

[57] ABSTRACT

A power supply for converting a plurality of alternating current (AC) and direct current (DC) input line voltages to a DC output voltage includes a converter for converting the input voltages to an intermediate voltage at a first node; a switching regulator having a power voltage at a second node for providing a reference voltage therefrom, and for providing a switching signal at a third node from the reference voltage and a feedback voltage; a circuit for electrically interconnecting the first node to the second node whenever the intermediate voltage exceeds a predetermined voltage; a transformer including a primary winding electrically interconnected with the first node, and a secondary winding having a secondary voltage; a feedback circuit cooperating with the transformer for providing the feedback voltage therefrom; a switching circuit responsive to the switching signal at the third node for switching an electrical current from the first node through the primary winding; and a circuit electrically interconnected with the secondary winding for converting the secondary voltage to the output voltage.

26 Claims, 7 Drawing Sheets

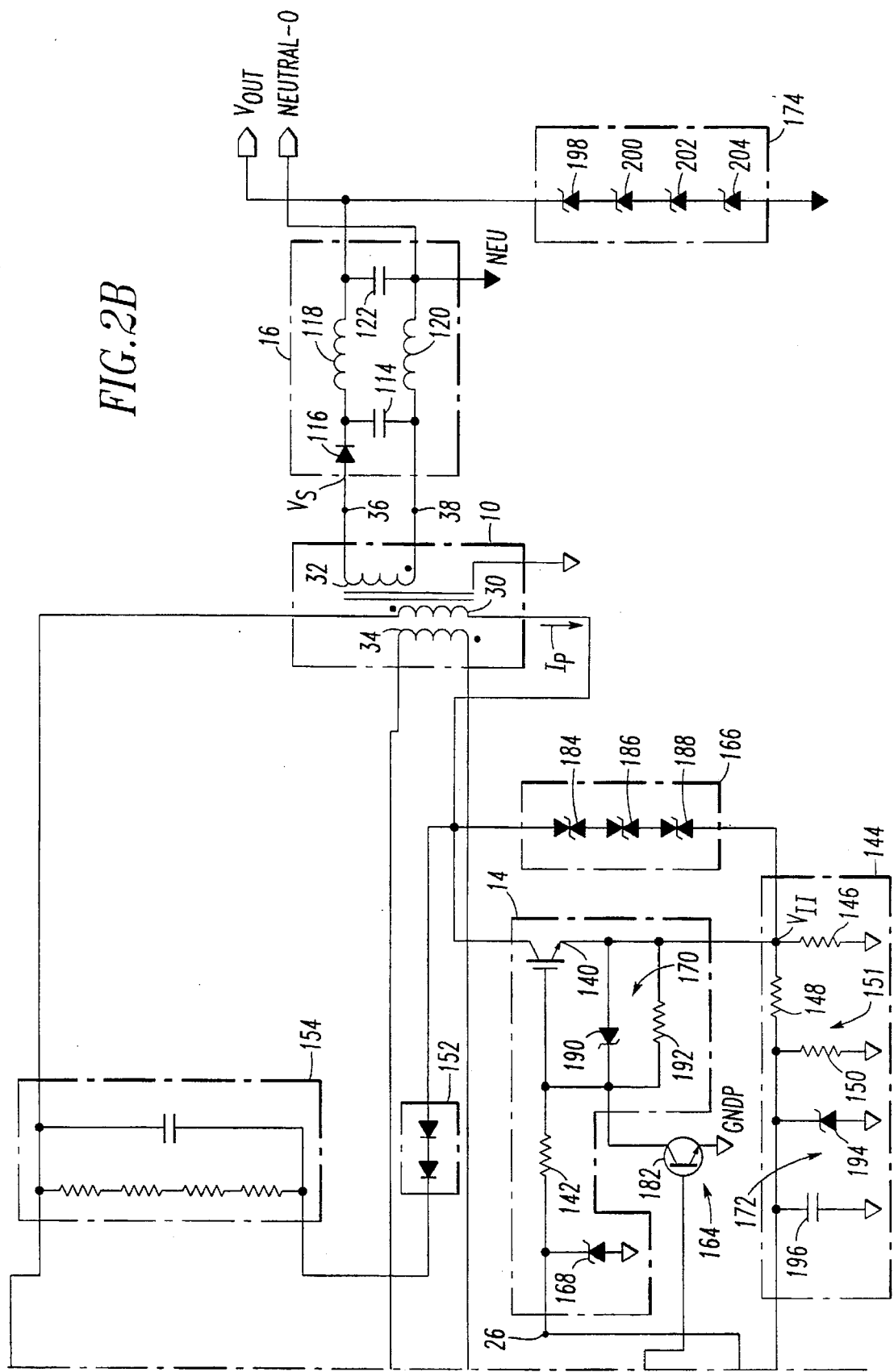

UNIVERSAL POWER MODULE

BACKGROUND OF THE INVENTION

1. Field of the Invention

This invention relates to a power supply for a power circuit and, more particularly, to a power supply which generates a power output from one or more input power lines.

2. Background Information

Various electrical and electronic systems utilize control direct current (DC) power derived from a variety of alternating current (AC) and DC input line voltages. For example, a nominal AC line voltage may be 110/120 VAC, 240 VAC, 480 VAC, or 575 VAC. Under normal operation, typical variations in these AC line voltages may present a wide range of possible input AC line voltages (e.g., about 60 through about 632 VAC). It is believed that such a wide voltage range has been addressed by a variety of different power supply designs, or configurations thereof, each of which is associated with a subset of this range of possible AC line voltages.

Furthermore, the AC line voltage may be single phase or plural phase (e.g., three phases). Moreover, AC line voltages may have a wide frequency range (e.g., 40 through 400 Hz). DC line voltages, of course, have a zero frequency.

Prior art power supplies have typically addressed the variety of AC line voltages with line frequency control power transformers and rectification circuits. However, such designs have been complicated by: (1) the variable number of phases (e.g., a single phase requires a greater volt-amp (VA) capacity while plural phases require plural transformer windings); (2) the variable line frequency (e.g., a relatively small change in line frequency from 60 Hz to 50 Hz requires about 16% more transformer mass); and (3) the variable line voltage (e.g., multiple transformer taps and associated jumpers are required). Furthermore, power transformers which input the AC line voltages preclude the input of a DC line voltage thereto.

Whenever surge waveforms must be suppressed from the line voltages, a power supply design is further complicated. In typical power supply surge tests, a power supply must operate without failure or interruption of its output voltage. The ANSI C62.41 surge waveform, for example, includes a 6 KV peak open circuit voltage output from a 2 ohm voltage source with a 1.2 μs rise time and a 50 μs fall time to 50% of the peak voltage output, and with a 3 KA peak short circuit current output with an 8 μs rise time and a 20 μs fall time to 50% of the peak current output. Although a simple single phase power transformer may typically be protected from a surge waveform by the addition of extra transformer insulation, requirements for plural phases, plural taps and the requisite terminations thereto present further opportunities for arcing and damage by the surge waveform.

A power supply design is even further complicated when the surge withstand capability requirement is coupled with the requirement for a wide range of line voltage magnitude and frequency. For line voltages having a possible 10:1 voltage variation, the power dissipation in some components varies by a factor of 100:1. For example, the power-up of a pulse-width modulation (PWM) controller is very difficult. If a resistor-zener combination is used to power the PWM controller, then a 100:1 change in power dissipation will occur at the resistor. In a circuit with a 5K Ω resistor, a 10 V zener and a running bias of about 10 mA, for example, the resistor would dissipate about 0.5 W at a relatively low 60 VDC input line voltage. However, at a relatively high 600 VDC input line voltage, for example, the resistor's power dissipation would increase to about 70 W.

There is a need for an improved single power supply which accepts a wide range of input line voltages.

There is a more particular need for such a power supply which accepts both AC and DC input line voltages.

There is an even more particular need for such a power supply which accepts a wide range of AC input line voltages over a wide range of line frequencies in addition to comparable magnitude DC input line voltages.

There is a still more particular need for such a power supply which provides substantial protection from surge waveforms on the input line voltages.

SUMMARY OF THE INVENTION

These and other needs are satisfied by the invention which is directed to a power supply apparatus for converting at least one input voltage to an output voltage. The power supply apparatus includes a converting circuit for converting the input voltages to an intermediate voltage at a first node; a switching regulator circuit having a power voltage at a second node for providing a reference voltage therefrom, and for providing a switching signal at a third node from the reference voltage and a feedback voltage; a circuit for electrically interconnecting the first node to the second node whenever the intermediate voltage exceeds a predetermined voltage; a transformer circuit including at least a primary winding electrically interconnected with the first node, and a secondary winding having a secondary voltage; a feedback circuit cooperating with the transformer circuit for providing the feedback voltage therefrom; a switching circuit responsive to the switching signal at the third node for switching an electrical current from the first node through the primary winding; and a circuit electrically interconnected with the secondary winding for converting the secondary voltage to the output voltage.

As another aspect of the invention, a power supply apparatus for converting at least one input voltage to an output voltage includes a first converting circuit for converting the input voltages to a first intermediate voltage at a first node; a second converting circuit for converting the first intermediate voltage to a second intermediate voltage at a second node; a switching regulator circuit having a power voltage at a third node for providing a reference voltage therefrom, and for providing a switching signal at a fourth node from the reference voltage and a feedback voltage; a circuit for electrically interconnecting the second node to the third node whenever the second intermediate voltage exceeds a predetermined voltage; a transformer circuit including at least a primary winding electrically interconnected with the first node, and a secondary winding having a secondary voltage; a feedback circuit cooperating with the transformer circuit for providing the feedback voltage therefrom; a switching circuit responsive to the switching signal at the fourth node for switching an electrical current from the first node through the primary winding; and a circuit electrically interconnected with the secondary winding for converting the secondary voltage to the output voltage.

BRIEF DESCRIPTION OF THE DRAWINGS

A full understanding of the invention can be gained from the following description of the preferred embodiment when read in conjunction with the accompanying drawings in which:

FIGS. 2A–2B, when placed side by side, are a schematic circuit diagram of a power supply in accordance with an embodiment of the invention;

DESCRIPTION OF THE PREFERRED EMBODIMENT

Figure 1:
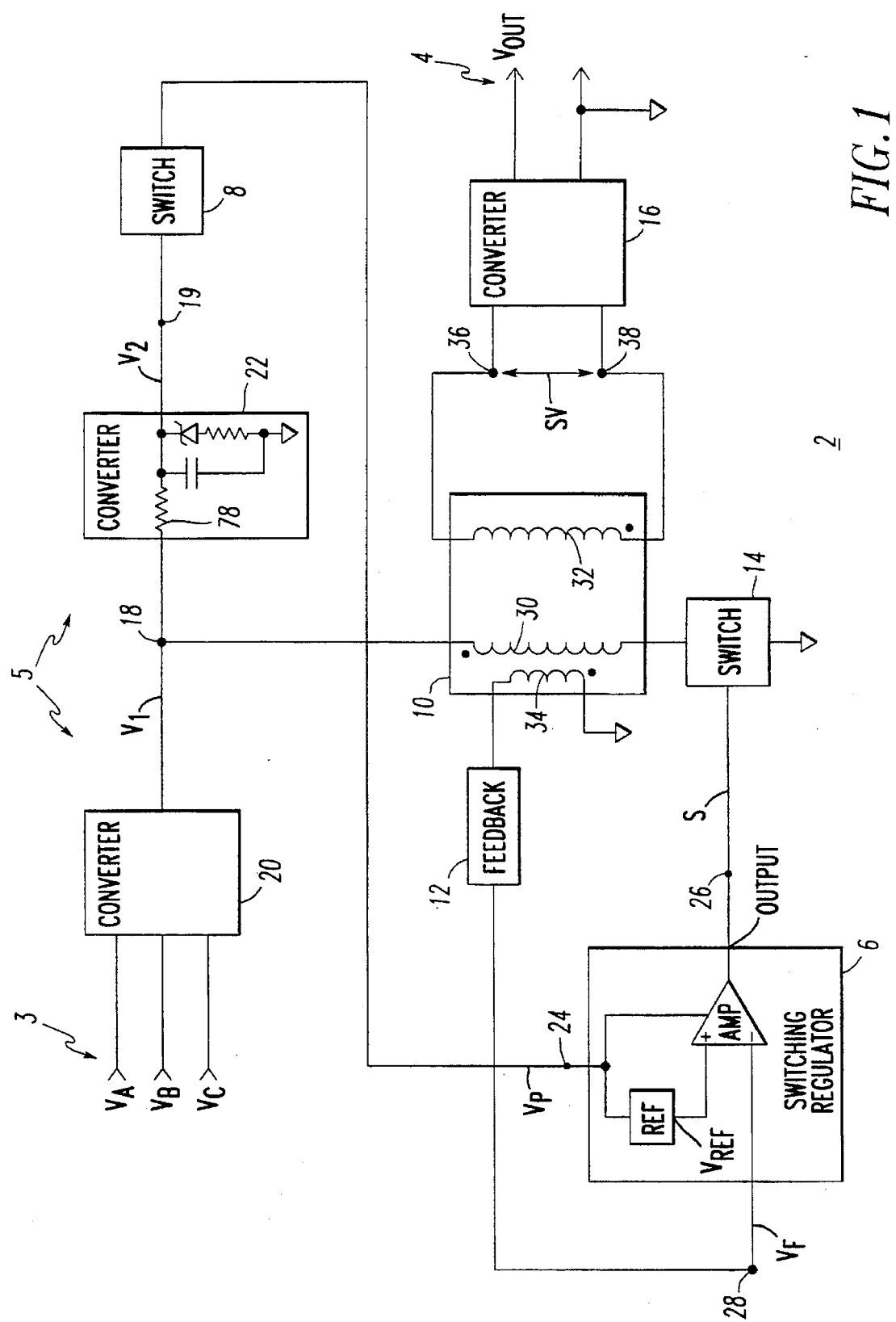
FIG. 1 is a block diagram of a power supply in accordance with the invention.

Referring to FIG. 1, a block diagram of a power supply 2 for converting one or more input voltages $V_A, V_B, V_C$ at input terminals 3 to an output voltage $V_{OUT}$ at output terminals 4 is illustrated. As described in greater detail below in connection with FIGS. 2A–2B, 3A–3B and 4A–4B the exemplary power supply 2 is suitable for providing a regulated DC output voltage from one or more of the AC or DC input voltages $V_A, V_B, V_C$ which exhibit a wide range of normal, transient or surge conditions such as, for example, an ANSI C62.41 surge waveform. The power supply 2 includes a converter 5, a switching regulator 6, a switch 8, a transformer 10, a feedback circuit 12, a switch 14 and a converter 16, the operation of which will be more fully understood as described below.

The converter 5 converts the input voltages $V_A, V_B, V_C$ to an intermediate voltage $V_1$ at node 18 and the intermediate voltage $V_1$ to another intermediate voltage $V_2$ at node 19. The converter 5 includes converters 20,22 which respectively convert the input voltages $V_A, V_B, V_C$ to voltage $V_1$ and the voltage $V_1$ to voltage $V_2$. The switching regulator 6 is powered at node 24 by voltage $V_P$ and provides a reference voltage $V_{REF}$ therefrom at output VREF of voltage reference REF. The switching regulator 6 also provides, at node 26, a switching signal S from output OUTPUT which is derived, in part, from the reference voltage $V_{REF}$ and a feedback voltage $V_F$ at node 28.

As explained in greater detail below in connection with FIGS. 2A–2B, the switch 8 electrically interconnects node 19 to node 24 whenever the voltage $V_2$ exceeds a predetermined voltage. The transformer 10 includes a primary winding 30, a secondary winding 32 and a tertiary winding 34. One end of the primary winding 30 is electrically interconnected with the node 18 and the other end is electrically interconnected with the switch 14. The switch 14, in turn, is responsive to the switching signal S at the node 26 for switching an electrical current from the node 18 through the primary winding 30. The tertiary winding 34 of the transformer 10 cooperates with the feedback circuit 12 and provides the feedback voltage $V_F$ therefrom. The secondary winding 32 has a secondary voltage SV between nodes 36,38. The converter 16 is electrically interconnected with the secondary winding 32 and converts the secondary voltage SV to the output voltage $V_{OUT}$.

Figure 2A:
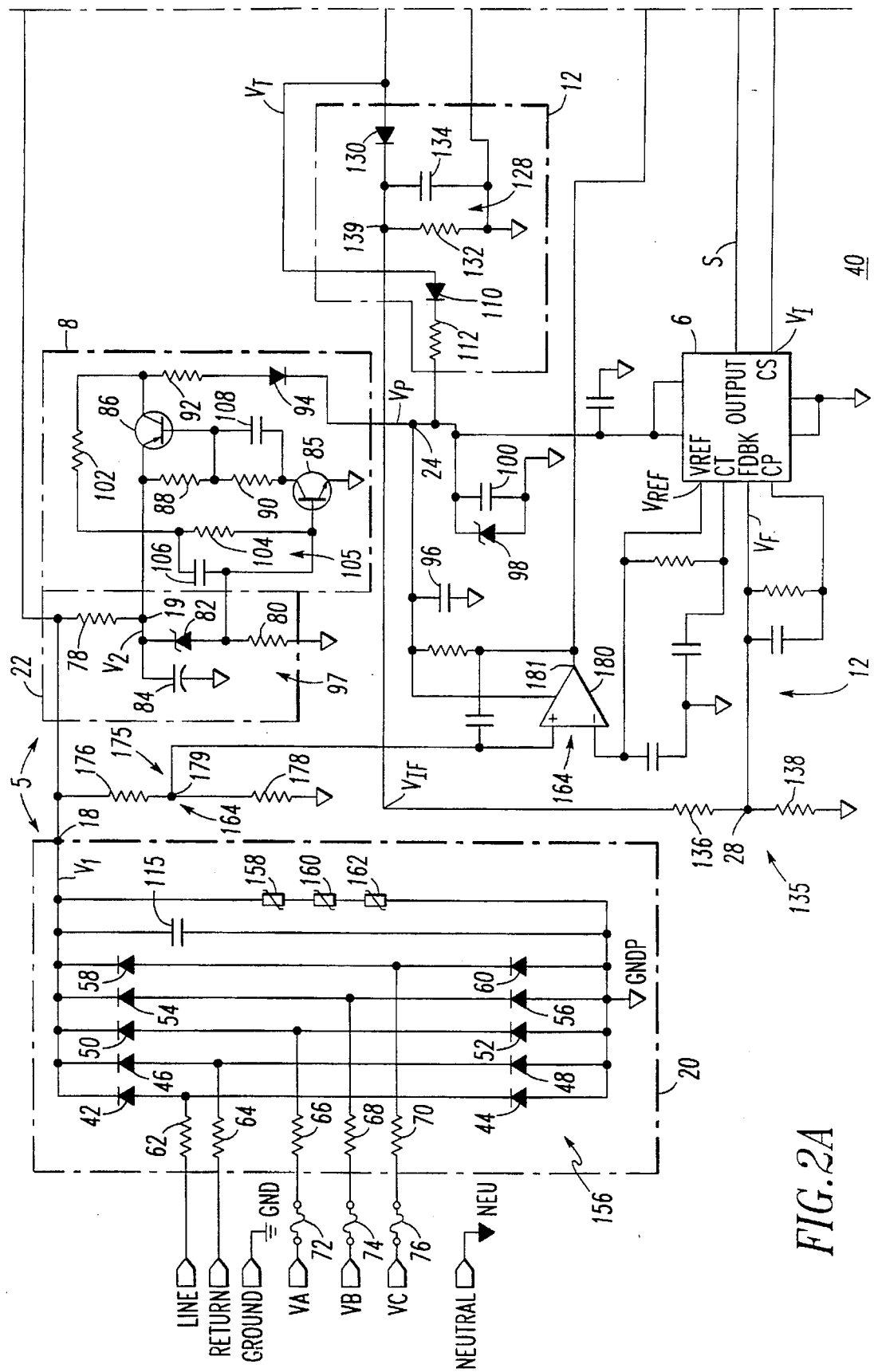

Also referring to FIGS. 2A–2B, a schematic circuit diagram of an exemplary power supply 40 is illustrated. The power supply 40 includes a single phase line voltage connection for the input voltages LINE,RETURN and the input common GROUND, and a three phase line voltage connection for the input voltages VA,VB,VC and the input common NEUTRAL. The GROUND and NEUTRAL input commons are respectively connected to GND and NEU ground signals. Although the GND, NEU and GNDP signals are not interconnected in the exemplary embodiment, in a three phase system with grounded neutral (not shown), the GND and NEU signals are connected at the power source (not shown). The GNDP signal changes with respect to the GND and NEU signals based on which one of the diodes 44,48, 52,56,60 is in conduction.

As will be discussed more fully below, the power supply 40 accepts one or more input voltages such as a single alternating current (AC) line voltage for input voltages LINE,RETURN; a single direct current (DC) line voltage for input voltages LINE,RETURN; or a three phase AC line voltage for input voltages VA,VB,VC and input common NEUTRAL. The exemplary single DC line voltage (e.g., a 300 VDC bus) has a voltage range of about 85 VDC to about 900 VDC. The exemplary three phase AC line voltage has a line-to-line voltage range of about 60 VAC to about 632 VAC. Any of the AC line voltages (e.g., 50 Hz, 60 Hz) may have a frequency range of about 40 Hz to about 400 Hz. The exemplary single load voltage is a regulated 24 VDC, 1 A, 24 VA output suitable for powering any industrial load such as, for example, an electric power meter, an AC drive, a motor starter, a programmable controller, or any other electrical or electronic load.

Any or all of the exemplary AC or DC line voltages may have an ANSI C62.41 surge waveform as understood by those skilled in the art. An important function of the power supply 40 is to continue operation during an ANSI C62.41 surge test without failure and without interruption of the load voltage. As explained below, the capacitance of capacitor 115 at the primary winding 30 of the transformer 10 is smaller than the capacitance of bulk storage capacitor 122 on the secondary side of the transformer 10. In this manner, significant energy storage is provided on the secondary side instead of the primary side of the transformer 10.

The power supply 40 includes the converters 5,20,22, switching regulator 6, switch 8, transformer 10, feedback circuit 12, switch 14 and converter 16 as discussed above in connection with FIG. 1. The converter 20 provides the voltage $V_1$ at node 18 from one or more of the input line voltages LINE-RETURN,VA,VB,VC. The input voltages LINE,RETURN, for either a single phase AC or DC line voltage, are associated with a pair of series-connected diodes 42–44,46–48 and a current limiting resistor 62,64, respectively. The input voltages VA,VB,VC, for a three phase AC line voltage, are associated with a pair of series-connected diodes 50–52,54–56,58–60 and a current limiting resistor 66,68,70, respectively. Fuses 72,74,76 protect the input power circuit associated with the input voltages VA,VB,VC, respectively. The voltage $V_1$ at node 18, as referenced from the ground signal GNDP at the anodes of the diodes 44,48, 52,56,60, is either a pulsating DC voltage, a generally DC voltage with a three-phase tipple waveform, or a DC voltage dependent upon whether the input line voltage is single phase AC, three phase AC, or DC, respectively. The diodes 42–44,46–48,50–52,54–56,58–60 of converter 20 provide a full wave rectification circuit for rectifying the AC line voltages to provide the voltage $V_1$ therefrom. The diodes 42–44,46–48 of converter 20 alternatively provide a circuit for sourcing the DC line voltage to the voltage $V_1$.

The converter 22, which converts the voltage $V_1$ at node 18 to the voltage $V_2$ at node 19, includes resistors 78,80, zener diode 82 and capacitor 84. Under normal input line voltages, capacitor 84 is charged through resistor 78 to a generally constant voltage determined by the predetermined zener voltage of zener diode 82 and the voltage drop across resistor 80, which is determined by the zener current of zener diode 82, the resistance of resistor 80 and the base-emitter voltage of transistor 85 (discussed below). Preferably, the resistor 78 has about a 3W rating and the zener voltage of zener diode 82 is about 24 V in order to accommodate the exemplary wide range of AC and DC input voltages VA,VB,VC,LINE-RETURN.

With a suitable voltage at node 19, the transistor 85 is turned on. Subsequently, with sufficient emitter-base voltage developed across resistor 88 by current flowing from node 19 through resistors 88 and 90 and through transistor 85, the series-pass transistor 86 sources current from node 19 through series-connected resistor 92 and diode 94, to node 24. This provides the DC voltage $V_P$ across capacitor 96. The resistors 78,80, zener diode 82 and capacitor 84 provide a circuit 97 for detecting a predetermined voltage at node 19 and turning on the transistor 85 in response to such predetermined voltage.

With a single phase DC line voltage, the converter 22 sources the DC voltage at node 19 from the DC voltage at node 18. Similarly, with a three phase AC line voltage, the converter 22 sources the DC voltage at node 19 from the generally DC voltage at node 18. However, with a single phase AC line voltage, the operation of the converter 22 and the switch 8 depends upon the magnitude of the single phase AC line voltage. Under very low line conditions with respect to the normal operating input voltage range of the power supply 40, the transistors 85,86 are not turned on and no current is sourced to node 24. Under generally nominal line conditions, transistors 85,86 are always turned on and current is sourced to node 24 to maintain the voltage $V_P$ as regulated by zener diode 98 and filtered by capacitor 100. Under certain low line conditions, transistors 85,86 are momentarily turned on by the peak voltage at node 18 and are otherwise turned off.

The transistors 85,86 form a latching circuit having a first state whenever the voltage $V_2$ exceeds a first predetermined voltage and a second state whenever the voltage $V_2$ falls below a second predetermined voltage which is lower than the first predetermined voltage as determined by the feedback resistors 102,104 in conjunction with the resistor 80. The transistor 86 is responsive to the transistor 85 which, in turn, is responsive to the detection circuit 97. The transistor 85 is turned on about when the circuit 97 detects the first predetermined voltage at node 19. In turn, the transistor 86 is turned on by the transistor 85. In the first ("on") state, the node 19 is electrically interconnected with the node 24 in response to a suitable input line voltage. In the second ("off") state, in response to an undervoltage condition of the input line voltage, the node 19 is electrically disconnected from the node 24. Subsequently, however, the transistor 86 electrically reconnects the node 19 to the node 24 in order to recover from the undervoltage condition whenever the voltage $V_2$ exceeds the first predetermined voltage. The diode 94 prevents discharge of the voltage $V_P$ through the switch 8 and, also, as discussed below, permits a separate charging path from the tertiary winding 34 of the transformer 10. During normal operation of the switching regulator 6, the voltage $V_P$ at node 24 is maintained by current from the tertiary winding 34, except during about the time of zero crossings of a single phase AC line (e.g., input VA, VB or VC). During such time, the capacitor 100 maintains the voltage $V_P$ to a suitable level. At startup, in the first state, the diode 94 electrically interconnects the voltage $V_2$ to the voltage $V_P$. Following startup, the separate charging path from the tertiary winding 34 of the transformer 10 predominates with the diode 94 generally sourcing negligible current.

Current flowing through the resistor 78 charges the capacitor 84, in the "off" state of the transistors 85,86, to a voltage (e.g., about 25 VDC) determined primarily by the zener diode 82 and, also, by the base-emitter voltage of the transistor 85. On the other hand, in the "on" state, the capacitor 84 is electrically interconnected with the node 24 by the transistor 86, the voltage of the capacitor 84 generally follows the line voltage at node 18, and the capacitor 84 is discharged through the transistor 86 and the resistor 92. Under relatively low input line conditions, a startup delay of about 15 seconds in the transition from the "off" state to the "on" state is provided by the capacitor 84.

An important feature of the present invention is an automatic restart feature provided by the switch 8. This feature is critical in the event of a relatively low input line condition for a single phase AC line. Under normal operation, with a three phase AC line or a single phase DC line, the switch 8 will normally always latch. However, with a relatively low condition of a single phase AC line, the switch 8 may not latch immediately. In this case, especially with a single phase AC line voltage of about 55-60 VAC, the switch 8 may unlatch and re-latch one or more times before normal operation of the switching regulator 6 is provided.

Resistors 102,104 form a feedback circuit 105 from the collector (output) of the transistor 86 to the base (input) of the transistor 85. The transistor 86 electrically interconnects the voltage $V_2$ at node 19 to the voltage $V_P$ at node 24 whenever the voltage $V_2$ exceeds the first predetermined voltage and electrically disconnects the voltage $V_2$ from the voltage $V_P$ when the voltage $V_2$ falls below the second predetermined voltage, with sufficient hysteresis preferably provided to prevent spurious switching between the first and second states. Capacitors 106,108 speed the latching of the transistors 85,86 in the first ("on") state.

The tertiary winding 34 of the transformer 10 has an AC tertiary voltage $V_T$, positive cycles of which supplement the charge of capacitors 96,100 and, hence, the voltage $V_P$ with current fed by diode 110 through resistor 112 of the feedback circuit 12. The secondary winding 32 of the transformer 10 has an AC secondary voltage $V_S$, positive cycles of which charge the capacitor 114 as rectified by a flyback diode 116. The voltage across the capacitor 114, in turn, is filtered by inductors 118,120 and the output capacitor 122. The output voltage $V_{OUT}$ and the output common NEUTRAL-O of the power supply 40 are obtained from opposite sides of the capacitor 122 and provide a single load voltage connection. Preferably, the capacitance of the capacitor 122 on the secondary side of the transformer 10 is greater than the capacitance of the capacitor 115 at the primary winding 30. The capacitor 115 filters and shapes the voltage $V_1$. The capacitor 122 provides bulk storage to maintain a suitably constant output voltage $V_{OUT}$. In this manner, bulk storage capacitance is provided for a relatively constant, DC voltage (e.g., $V_{OUT}$) rather than a voltage (e.g., $V_1$) which has relatively wide voltage and frequency ranges. Furthermore, with a relatively small value of capacitance of the capacitor 115 with respect the relatively large value of capacitance of the capacitor 122, the capacitor 115 is more readily protected from transients or surge conditions.

In the exemplary embodiment, during single phase AC line zero crossings at low voltage (e.g., at about 60 VAC), the capacitor 115 (e.g., about 0.22 μF) does not maintain sufficient charge to power the primary 30. However, the capacitor 100 (e.g., about 10 μF) suitably maintains control power for the switching regulator 6 and the capacitor 122 (e.g., about 3300 μF) suitably maintains the +24 VDC output voltage $V_{OUT}$.

The feedback circuit 12 also includes a rectification circuit 128 having diode 130, resistor 132 and capacitor 134, and a divider circuit 135 having resistors 136 and 138. The rectification circuit 128 rectifies the tertiary voltage $V_T$ and produces an intermediate feedback voltage $V_{IF}$ therefrom at node 139. In turn, the divider circuit 135 produces the feedback voltage $V_F$, at input FDBK of the switching regulator 6, from the intermediate feedback voltage $V_{IF}$.

The switch 14 includes a switching transistor 140, such as the exemplary insulated gate bipolar transistor, interconnected with the primary winding 30 of the transformer 10. The node 26 having the switching signal S is electrically interconnected with the gate of the transistor 140 by resistor 142. The primary current $I_P$ of the primary winding 30 flows through the transistor 140 whenever it is turned on by the true or on-state of the switching signal S. The primary current $I_P$, in turn, is conditioned by a conditioning circuit 144 which develops a current sense signal $V_I$ at input CS of the switching regulator 6. In addition to the feedback voltage $V_F$ discussed above, the switching regulator 6 also derives the switching signal S, in part, from the reference voltage $V_{REF}$ and the current sense signal $V_1$.

During initial startup of the exemplary switching regulator 6, the current sense input CS limits the primary current $I_P$ which is required to establish the appropriate secondary voltage $V_S$ of the secondary winding 32. Subsequently, under abnormal operating conditions, the current sense input CS facilitates short-circuit protection and limits the primary current $I_P$ to a suitable value. Otherwise, the FDBK input of the switching regulator 6 dominates under normal operating conditions. The exemplary switching regulator 6 (as well as the switching signal S and switching transistor 140) operate at about an exemplary 10 kHz switching frequency which is established at a CT input thereof, although the invention is applicable to any switching frequency. The switching regulator 6 also has a CP input which provides suitable compensation for an error amplifier AMP (shown in FIG. 1) which compares the reference $V_{REF}$ and feedback $V_F$ voltages.

The conditioning circuit 144 includes resistors 146,148, 150. The primary current $I_P$, which flows through the transistor 140 when the switching signal S is active, produces an intermediate current sense voltage $V_{II}$ across the resistor 146. In turn, the resistors 148,150 form a divider circuit 151 which produces the current sense signal $V_I$ from the intermediate current sense voltage $V_{II}$. Whenever the transistor 140 is turned off, the primary current $I_P$ is alternatively directed by a diode circuit 152 to a snubber circuit 154, thereby eliminating the stray energy from the transformer 10 and the transistor 140.

The converter 20 also includes a surge suppression circuit 156 for suppressing an ANSI C62.41 surge waveform from the intermediate voltage $V_1$ at node 18. The circuit 156 includes the series resistors 62,64,66,68,70, which limit the current through each respective pair 42–44,46–48,50–52, 54–56,58–60 of the diodes 42–60, thereby protecting such diodes from overcurrent; the capacitor 115, which shapes the surge waveform at the node 18; and three series metal oxide varistors (MOV's) 158,160,162, which operate in conjunction with the series resistors 62–70, clamp the voltage of the surge waveform between the node 18 and the ground GNDP, and protect the capacitor 115 and the diodes 42–60 from overvoltage.

The power supply 40 also includes additional surge suppression circuits 164,166,168,170,172,174. Circuit 164 includes a divider 175 having resistors 176,178 with an output 179; an operation amplifier 180; and a transistor 182. The negative (−) input of the operational amplifier 180 is connected to the VREF output of the switching regulator 6 and is referenced to the reference voltage $V_{REF}$. The positive (+) input of the operational amplifier 180 is connected to the output 179 of the divider 175 which provides an attenuated version of the intermediate voltage $V_1$ at node 18. Whenever a surge voltage causes the intermediate voltage $V_1$ to exceed a predetermined voltage, as determined by the reference voltage $V_{REF}$ and the preselected values of the resistors 176,178, the output 181 of the operational amplifier 180, which is connected to the base of transistor 182, turns on the transistor 182. The collector of the transistor 182 is connected to the gate of the transistor 140. Whenever the transistor 182 is turned on, the transistor 140 is turned off, thereby protecting the transistor 140 from an excessive surge current which would have been caused by the surge voltage and, also, keeping the transistor 140 within its safe operating area.

Circuit 166 includes three series bi-directional zener diodes 184,186,188. The circuit 166 is connected between the collector and emitter of the transistor 140 and protects such transistor from an excessive surge voltage.

Circuit 168 is a zener diode which protects the output OUTPUT of the switching regulator 6 from an excessive feedback voltage (from current $I_P$, through the resistor 146) which causes current to flow through the anode of diode 190, through resistor 142 and into the cathode of zener diode 168. Such excessive feedback can occur during ANSI C62.41 type transients. Circuit 170 includes zener diode 190 in parallel with gate-emitter resistor 192. The zener diode 190 protects the gate-emitter junction of the transistor 140 from transients in the zener mode of the diode 190, and from excessive reverse gate-emitter voltage in the diode mode when the transistor 182 is turned on. The transistor 140 is also protected by the inductance of the primary winding 30 of the transformer 10 along with the resistance of the resistor 146.

Circuit 172, which includes zener diode 194 and capacitor 196, reduces the impact of transients and protects the input CS of the switching regulator 6 from an excessive surge voltage at the intermediate voltage $V_1$ coupled from node 18 through the primary winding 30 of the transformer 10 and through the transistor 140 into resistor 146. The zener diode 194 protects the input CS from damage caused by an excessive feedback voltage $V_I$.

Circuit 174 includes four series-zener diodes 198,200, 202,204 which clamp or limit the surge voltage and other transients of the intermediate voltage $V_1$ coupled from node 18 through the secondary winding 32 of the transformer 10 and through the converter 16 to the output voltage $V_{OUT}$. Otherwise, under normal operation, the circuit 174, like the circuits 166,168, is an open circuit.

Figure 3A:
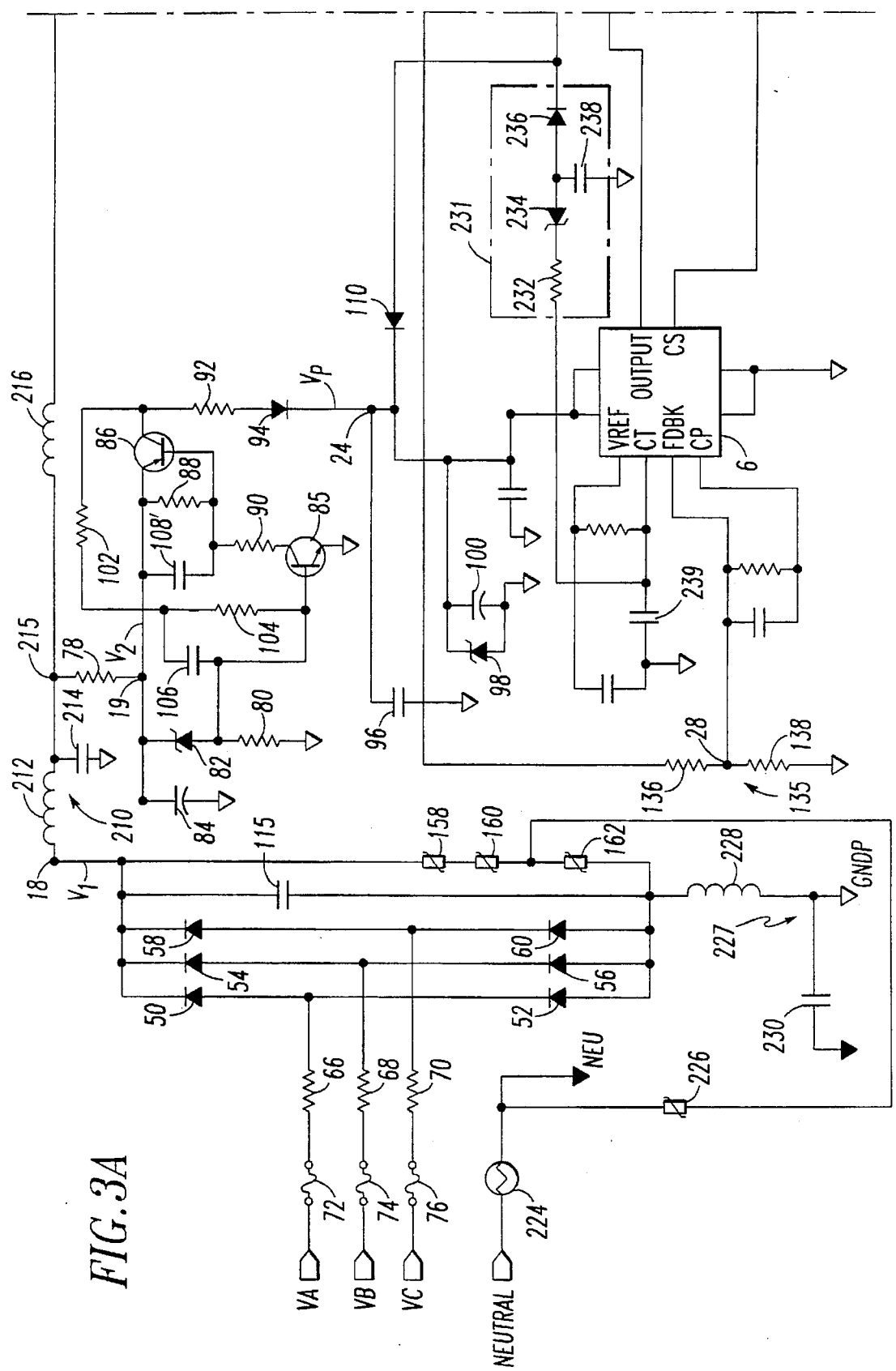
FIGS. 3A–3B, when placed side by side, are a schematic circuit diagram of a power supply in accordance with another embodiment of the invention.
Figure 3B:
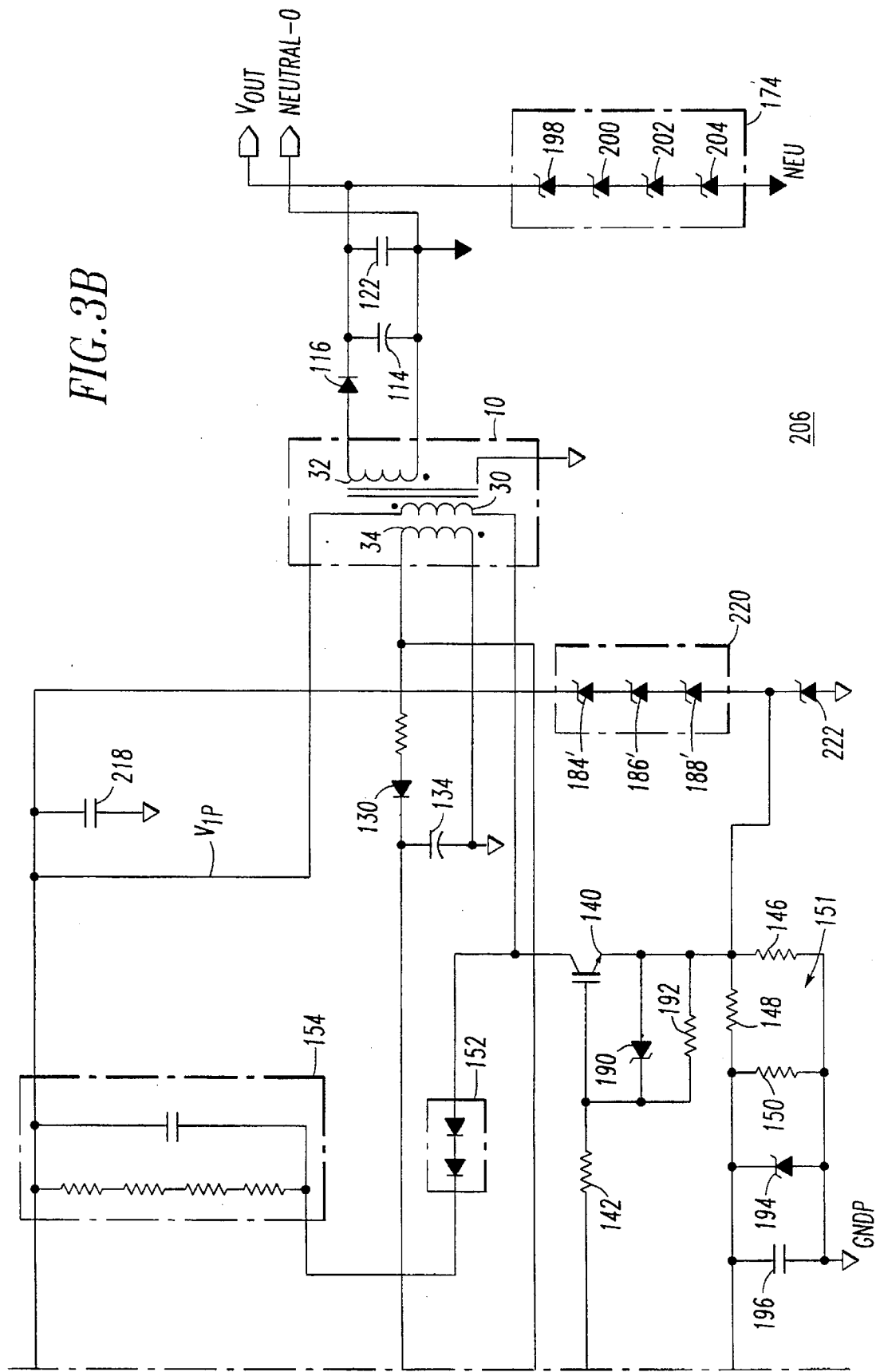

FIGS. 3A–3B illustrate another power supply 206 which is similar to the power supply 40 of FIGS. 2A–2B. The power supply 206 includes a three phase line voltage connection for the input voltages VA,VB,VC and the input common NEUTRAL. The three phase AC line voltage has a line-to-line voltage range of about 90 VAC to about 600 VAC. Any of the AC line voltages may have a frequency range of about 45 Hz to about 66 Hz. The exemplary single load voltage is a regulated 24 VDC, 1 A, 24 VA output suitable for powering any industrial load such as, for example, an electric power meter, an AC drive, a motor starter, a programmable controller, or any other electrical or electronic load.

A low pass filter 210 including inductor 212 and capacitor 214 provides further shaping of the surge waveform between node 18 and node 215 at resistor 78. Inductor 216, connected between node 215 and the primary winding 30 of the transformer 10, limits the current from the node 18 to the switching transistor 140. Capacitor 218 provides further shaping of the voltage $V_{1P}$ at the primary winding 30. Capacitor 218 is protected by the MOV's 158,160,162, the low pass filter 210 and the inductor 216.

A zener diode circuit 220, including three series zener diodes 184',186',188', limits the voltage across the primary winding 30 of the transformer 10 and the switching transistor 140. In this manner, the circuit 220, the impedance of the primary winding 30 and the resistance of the resistor 146 protect the switching transistor 140 from surge voltages and transients. Zener diode 222 protects resistor 146 and the CS input of the switching regulator 6. The zener diode 222, which is in series with the circuit 220, also limits the voltage $V_{1P}$ and further protects capacitor 218.

Positive temperature coefficient (PTC) resistive element 224 limits the current between the input common NEUTRAL and the ground signal NEU. The three series MOV's 158,160,226, which operate in conjunction with the series resistors 66–70, clamp the voltage of the surge waveform between the node 18 and the ground signal NEU. Low pass filter 227, including inductor 228 and capacitor 230, prevent radio frequency interference (RFI) from being coupled back to the input voltages VA,VB,VC. The capacitor 106 speeds the latching of the transistors 85,86 in the first ("on") state. The capacitor 108' slows the response of transistor 86 to prevent spurious transitions caused by noise or surge transients at node 19.

A switching frequency modulation circuit 231 includes the resistor 232, zener diode 234, diode 236 and capacitor 238 connected between the tertiary winding 34 of the transformer 10 and the CT input of the switching regulator 6. Under relatively high input voltage conditions (e.g., at about greater than 300 V), the modulation circuit 231 modulates the CT input of the switching regulator 6 in order to decrease the frequency of the switching signal S. This is significant, because at high voltages, the switching transistor 140 has a larger switching loss and a shorter on-state time. By reducing the switching frequency, power losses in the switching transistor 140 are reduced which improves the efficiency of the power supply 206 at relatively high input voltage conditions.

When the switching transistor 140 is turned on, the voltage of the tertiary winding 34 is proportional to the voltage of the secondary winding 32 of the transformer 10 (which establishes the DC voltage $V_{OUT}$ through the diode 116). On the other hand, when the switching transistor 140 is turned off, the voltage of the tertiary winding 34 is proportional to the voltage of the primary winding 30 (which follows the intermediate voltage $V_{1P}$ and the input voltages $V_A,V_B,V_C$). The diode 236 and capacitor 238 determine a negative voltage across the capacitor 238 which is proportional to the input voltages $V_A,V_B,V_C$. About when the magnitude of the voltage across the capacitor 238 exceeds the zener voltage of zener diode 234, resistor 232 removes charge from capacitor 239 at the CT input of the switching regulator 6, thereby decreasing the switching frequency. Otherwise, at relatively low input voltage conditions (e.g., less than about 300 V), the switching frequency of the switching regulator 6 is not modulated by the modulation circuit 231.

Figure 4A:
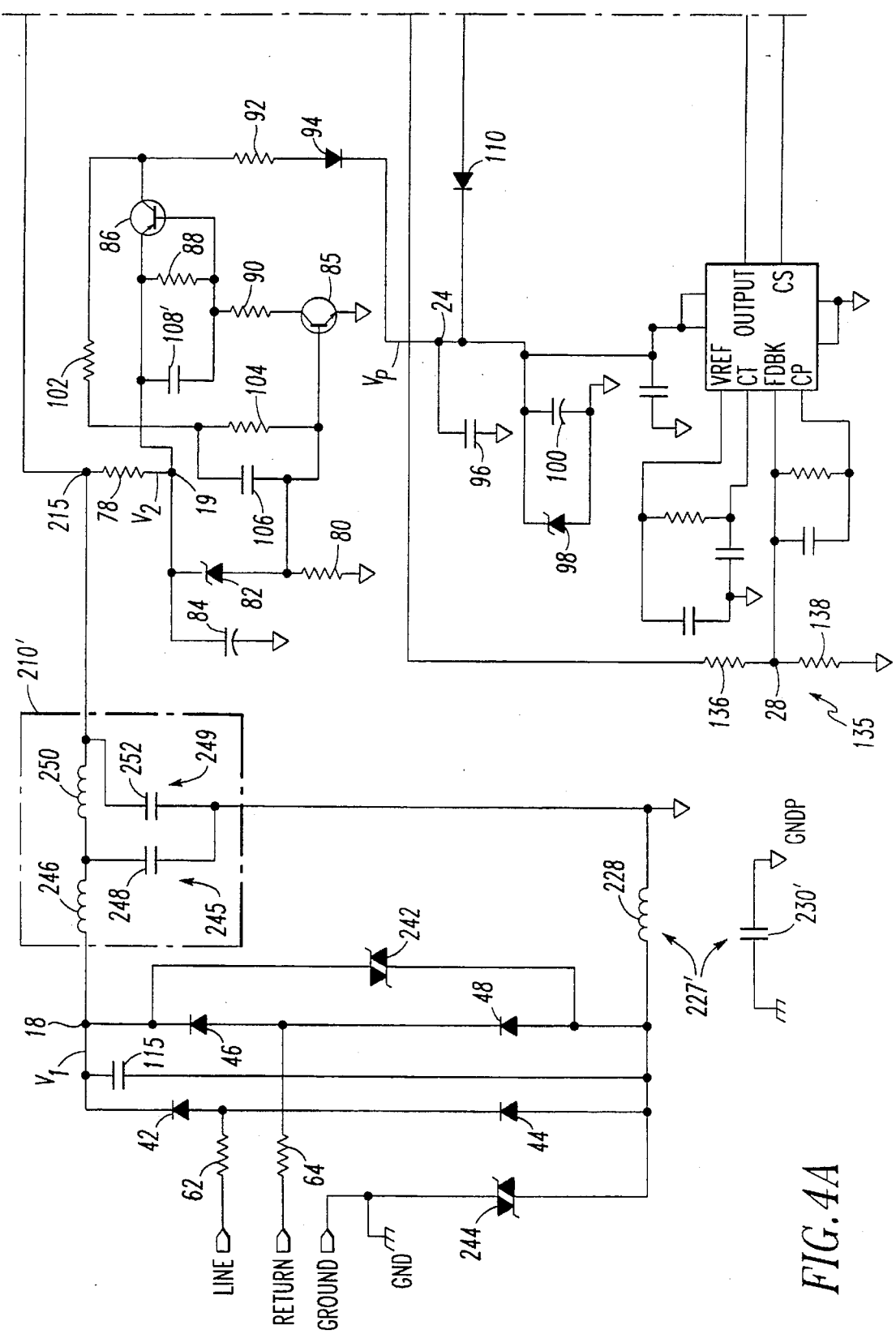
FIGS. 4A–4B, when placed side by side, are a schematic circuit diagram of a power supply in accordance with another embodiment of the invention.
Figure 4B:
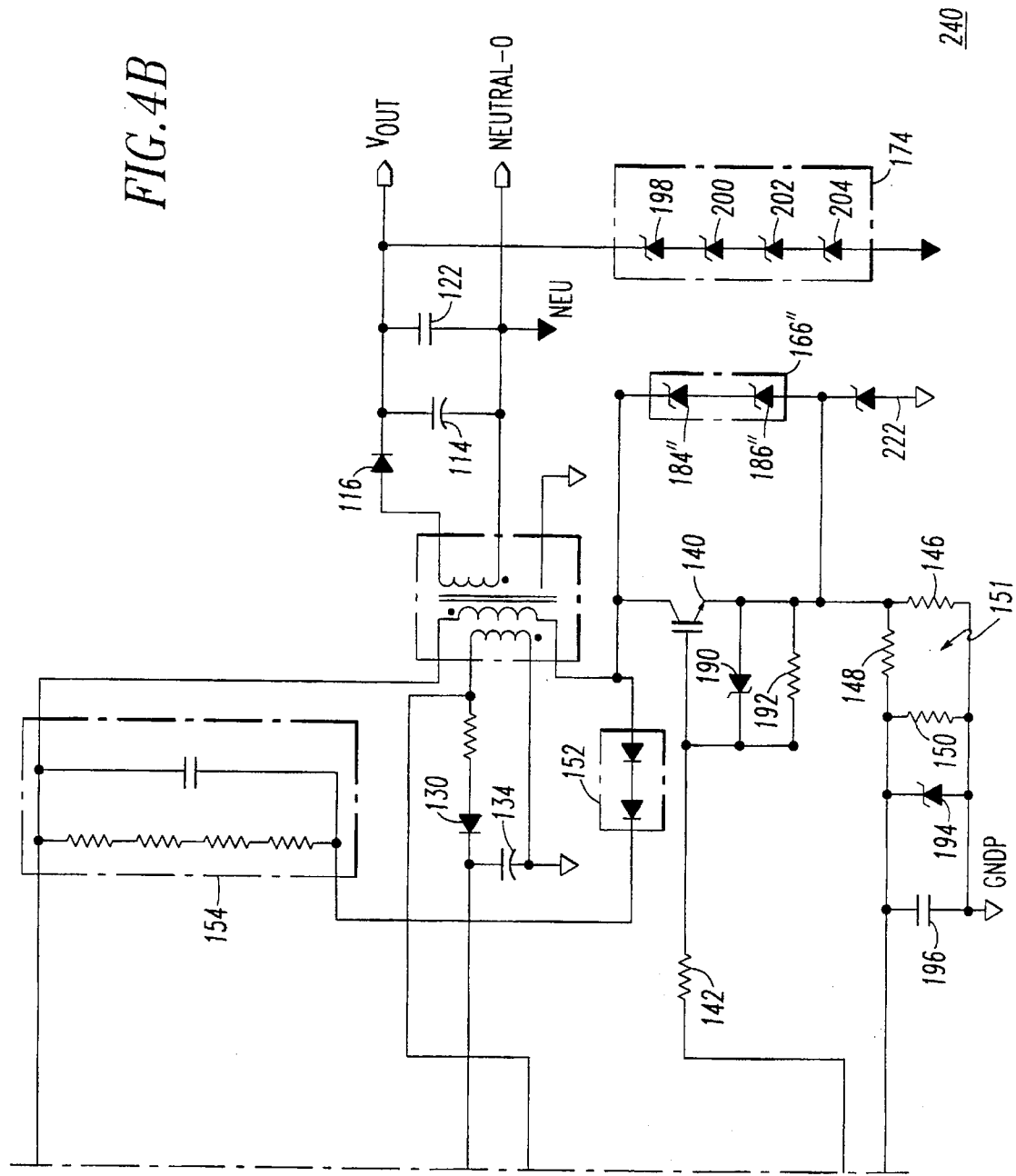

FIGS. 4A–4B illustrate another power supply 240 which is similar to the power supply 40 of FIGS. 2A–2B and the power supply 206 of FIGS. 3A–3B. The power supply 240 includes a single phase line voltage connection for input voltages LINE,RETURN and input common GROUND. The single phase AC or DC line voltage has an AC voltage range of about 96 VAC to about 264 VAC or a DC voltage range of about 100 to about 350 VDC. The AC line voltage may have a frequency range of about 45 Hz to about 66 Hz. The exemplary single load voltage is a regulated 24 VDC, 1 A, 24 VA output suitable for powering any industrial load such as, for example, an electric power meter, an AC drive, a motor starter, a programmable controller, or any other electrical or electronic load.

MOV 242, which operates in conjunction with the series resistors 62,64, clamps the voltage of the surge waveform between the node 18 and the anodes of the diodes 44,48, and protects the capacitor 115 and the diodes 42–48 from overvoltage. The MOV 244 similarly limits the voltage between the input common GROUND and the anodes of the diodes 44,48. Low pass filter 227', including inductor 228 and capacitor 230', prevent radio frequency interference (RFI) from being coupled back to the input voltages VA,VB, VC.

A low pass filter 210' provides further shaping of the surge waveform between node 18 and node 215 at resistor 78. The filter 210' includes a first series low pass filter 245, having inductor 246 and capacitor 248, and a second series low pass filter 249, having inductor 250 and capacitor 252.

Circuit 166" includes two series zener diodes 184",186". The circuit 166" is connected between the collector and emitter of the transistor 140 and protects such transistor from an excessive surge voltage.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A power supply apparatus for converting at least one input line voltage to an output voltage, said power supply apparatus comprising:

converting means for converting said at least one input line voltage to an intermediate voltage at a first node, with said at least one input line voltage having a voltage range including a maximum voltage and a minimum voltage, and with a ratio of the maximum voltage to the minimum voltage being about 10:1;

switching regulator means having a power voltage at a second node for providing a reference voltage therefrom, and for providing a switching signal at a third node from the reference voltage and a feedback voltage;

means for electrically interconnecting the first node to the second node whenever the intermediate voltage exceeds a predetermined voltage;

transformer means including at least a primary winding electrically interconnected with the first node, and a secondary winding having a secondary voltage;

feedback means cooperating with said transformer means for providing the feedback voltage therefrom;

switching means responsive to the switching signal at the third node for switching an electrical current from the first node through the primary winding; and means electrically interconnected with the secondary winding for converting the secondary voltage to the output voltage.

2. The power supply apparatus as recited in claim 1 wherein said at least one input line voltage is an alternating current (AC) line voltage; wherein said voltage range is about 60 VAC to about 632 VAC; and wherein said converting means includes full wave rectification means for rectifying the AC line voltage to provide the intermediate voltage therefrom.

3. The power supply apparatus as recited in claim 1 wherein said at least one input line voltage is a direct current (DC) voltage, wherein said voltage; range is about 85 VDC to about 900 VDC; and wherein said converting means includes means for sourcing the DC voltage to the intermediate voltage.

4. The power supply apparatus as recited in claim 1 wherein said at least one input line voltage includes at least one of an alternating current (AC) line voltage having a voltage range of about 60 VAC to about 632 VAC and a direct current (DC) voltage having a voltage range of about 85 VDC to about 900 VDC.

5. The power supply apparatus as recited in claim 1 wherein said at least one input line voltage includes an alternating current (AC) line voltage; and wherein said means for electrically interconnecting the first node to the second node includes means for electrically disconnecting the first node from the second node in response to an undervoltage condition of the AC line voltage and for electrically reconnecting the first node to the second node in order to recover from the undervoltage condition.

6. The power supply apparatus as recited in claim 1 wherein said at least one input voltages include a surge waveform; and wherein said converting means includes surge suppression means for suppressing the surge waveform from the intermediate voltage.

7. The power supply apparatus as recited in claim 6 wherein said at least one input line voltage is a plurality of input line voltage; wherein said converting means includes a plurality of diode pairs for converting the input line voltages to the intermediate voltage; and wherein the surge suppression means includes a series resistor for each of the diode pairs, a capacitor for shaping the surge waveform at the first node and varistor means for clamping the voltage of the surge waveform at the first node.

8. The power supply apparatus as recited in claim 7 wherein said switching means includes a switching transistor interconnected with the primary winding and zener diode means for limiting the voltage of the switching transistor at the primary winding.

9. A power supply apparatus for converting at least one input line voltage to an output voltage, said power supply apparatus comprising:
first converting means for converting said at least one input line voltage to a first intermediate voltage at a first node, with said at least one input line voltage having a voltage range including a maximum voltage and a minimum voltage, and with a ratio of the maximum voltage to the minimum voltage being about 10:1;
second converting means for converting the first intermediate voltage to a second intermediate voltage at a second node;
switching regulator means having a power voltage at a third node for providing a reference voltage therefrom, and for providing a switching signal at a fourth node from the reference voltage and a feedback voltage;
means for electrically interconnecting the second node to the third node whenever the second intermediate voltage exceeds a predetermined voltage;
transformer means including at least a primary winding electrically interconnected with the first node, and a secondary winding having a secondary voltage;
feedback means cooperating with said transformer means for providing the feedback voltage therefrom;
switching means responsive to the switching signal at the fourth node for switching an electrical current from the first node through the primary winding; and
means electrically interconnected with the secondary winding for converting the secondary voltage to the output voltage.

10. The power supply apparatus as recited in claim 9 wherein said at least one input line voltage includes an alternating current (AC) line voltage; and wherein said first converting means includes full wave rectification means for rectifying the AC line voltage to provide the first intermediate voltage therefrom.

11. The power supply apparatus as recited in claim 10 wherein the AC line voltage includes a voltage range of about 60 VAC to about 632 VAC.

12. The power supply apparatus as recited in claim 9 wherein said at least one input line voltage includes a plurality of alternating current (AC) line voltages; and wherein said first converting means includes full wave rectification means for rectifying the AC line voltages to provide the first intermediate voltage therefrom.

13. The power supply apparatus as recited in claim 12 wherein the input AC line voltages include at least two phases; having a voltage range of about 60 VAC to about 632 VAC between the phases.

14. The power supply apparatus as recited in claim 9 wherein said at least one input line voltage includes a direct current (DC) voltage; and wherein said first converting means includes means for sourcing the DC voltage to the first intermediate voltage.

15. The power supply apparatus as recited in claim 14 wherein the DC voltage includes a voltage range of about 85 VDC to about 900 VDC.

16. The power supply apparatus as recited in claim 9 wherein said second converting means includes a capacitor, a resistor and detecting means for detecting the predetermined voltage at the capacitor; wherein the capacitor is charged from the first intermediate voltage through the resistor; and wherein said means for electrically interconnecting the second node to the third node includes a series pass transistor responsive to the detecting means for sourcing the second intermediate voltage to the power voltage.

17. The power supply apparatus as recited in claim 16 wherein the capacitor has a voltage; and wherein said means for electrically interconnecting the second node to the third node includes latching means having a first state whenever the voltage of the capacitor exceeds a first predetermined voltage and a second state whenever the voltage of the capacitor falls below a second predetermined voltage.

18. The power supply apparatus as recited in claim 17 wherein the second node is electrically interconnected with the third node in the first state and is electrically disconnected from the third node in the second state.

19. The power supply apparatus as recited in claim 9 wherein said means for electrically interconnecting the second node to the third node includes first diode means for electrically interconnecting the second intermediate voltage to the power voltage; wherein said transformer means further includes a tertiary winding having a tertiary voltage; and wherein said feedback means includes rectification means for rectifying the tertiary voltage and producing the feedback voltage therefrom, and second diode means for electrically interconnecting the tertiary voltage to the power voltage.

20. The power supply apparatus as recited in claim 9 wherein the primary winding has a first capacitor associated therewith; and wherein said means for converting the secondary voltage to the output voltage includes a second capacitor and flyback means for rectifying the secondary voltage, with the capacitance of the second capacitor being greater than the capacitance of the first capacitor.

21. The power supply apparatus as recited in claim 9 wherein said second converting means includes a capacitor, a resistor and detecting means for detecting the predetermined voltage at the capacitor; wherein the capacitor is charged from the first intermediate voltage through the resistor; and wherein said means for electrically interconnecting the second node to the third node includes first transistor means and second transistor means; wherein the first transistor means is turned on about when said detecting means detects the predetermined voltage; and wherein the second transistor means is turned on by the first transistor means.

22. The power supply apparatus as recited in claim 21 wherein said means for electrically interconnecting the second node to the third node further includes feedback means between the second transistor means and the first transistor means in order that the second transistor means electrically interconnects the second intermediate voltage to the power voltage whenever the second intermediate voltage exceeds a first predetermined voltage and electrically disconnects the second intermediate voltage from the power voltage whenever the second intermediate voltage falls below a second predetermined voltage.

23. The power supply apparatus as recited in claim 9 wherein said at least one input line voltage includes a plurality of alternating current (AC) line voltages each of which includes an ANSI C62.41 surge waveform; and wherein said first converting means includes full wave rectification means for converting the AC line voltages to the first intermediate voltage, and surge suppression means for suppressing the ANSI C62.41 surge waveform from the first intermediate voltage.

24. The power supply apparatus as recited in claim 23 wherein the second converting means includes low-pass filter means for shaping the surge waveform at the second node and inductor means for limiting the current from the first node to said switching means.

25. The power supply apparatus as recited in claim 9 wherein the switching signal of said switching regulator means has a switching frequency; and wherein said switching regulator means includes modulation means for modulating the switching frequency about when said at least one input line voltage exceeds a predetermined value.

26. The power supply apparatus as recited in claim 25 wherein said modulation means includes detecting means for detecting about when said at least one input line voltage exceeds the predetermined value, and means responsive to said detecting means for decreasing the switching frequency about when said at least one input line voltage exceeds the predetermined value.

* * * * *